(12) United States Patent
Hashizume

(10) Patent No.: US 10,942,433 B2
(45) Date of Patent: Mar. 9, 2021

(54) LIGHT SOURCE DEVICE AND PROJECTOR

(71) Applicant: SEIKO EPSON CORPORATION, Tokyo (JP)

(72) Inventor: Toshiaki Hashizume, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/728,353

(22) Filed: Dec. 27, 2019

(65) Prior Publication Data
US 2020/0209723 A1     Jul. 2, 2020

(30) Foreign Application Priority Data

Dec. 28, 2018 (JP) .............................. JP2018-247459

(51) Int. Cl.
| | |
|---|---|
| *G03B 21/20* | (2006.01) |
| *F21V 9/38* | (2018.01) |
| *G03B 21/16* | (2006.01) |
| *F21K 9/64* | (2016.01) |
| *F21Y 115/30* | (2016.01) |

(52) U.S. Cl.
CPC .............. *G03B 21/204* (2013.01); *F21K 9/64* (2016.08); *F21V 9/38* (2018.02); *G03B 21/16* (2013.01); *G03B 21/2066* (2013.01); *F21Y 2115/30* (2016.08)

(58) Field of Classification Search
CPC ..... F21K 9/64; F21V 9/30; F21V 9/38; F21Y 2115/30; G03B 21/204; G03B 21/005; G03B 21/006; G03B 21/208; G02B 26/008
See application file for complete search history.

(56) References Cited

U.S. PATENT DOCUMENTS

| | | | | |
|---|---|---|---|---|
| 9,671,089 | B2* | 6/2017 | Strauß | G02B 5/136 |
| 9,785,039 | B2* | 10/2017 | Motoya | H01S 5/0092 |
| 9,891,511 | B2* | 2/2018 | Chang | C09K 11/08 |
| 9,927,099 | B2* | 3/2018 | Wu | G02B 26/008 |
| 10,134,958 | B2* | 11/2018 | Zheng | H01L 33/502 |
| 10,355,175 | B2* | 7/2019 | Lee | F21S 2/00 |
| 10,437,042 | B2* | 10/2019 | Sprague | H04N 9/3158 |
| 10,698,307 | B2* | 6/2020 | Watanabe | G02B 6/0008 |

(Continued)

FOREIGN PATENT DOCUMENTS

JP     2011-129354 A     6/2011

*Primary Examiner* — Peggy A Neils
(74) *Attorney, Agent, or Firm* — Dority & Manning, PA

(57) ABSTRACT

A light source device includes a light source configured to emit excitation light, a wavelength conversion section configured to perform wavelength conversion on the excitation light to generate fluorescence having a wavelength longer than a wavelength of the excitation light, a substrate opposed to the wavelength conversion section, and an air gap disposed between the wavelength conversion section and the substrate, wherein the wavelength conversion section has a first surface opposed to the substrate, the substrate has a second surface opposed to the first surface, a thickness dimension of the air gap as a dimension in a direction from the first surface toward the second surface is defined by a sum of a roughness of the first surface and a roughness of the second surface, and the thickness dimension of the air gap is no smaller than a wavelength of the fluorescence.

16 Claims, 6 Drawing Sheets

(56) References Cited

U.S. PATENT DOCUMENTS

| | | |
|---|---|---|
| 2011/0149549 A1 | 6/2011 | Miyake |
| 2018/0245772 A1* | 8/2018 | Tomita ................. G02B 5/0858 |
| 2018/0356716 A1* | 12/2018 | Hashizume ........... H01L 33/502 |
| 2019/0339604 A1* | 11/2019 | Takeuchi .................. F21V 7/26 |

* cited by examiner

LIGHT SOURCE DEVICE AND PROJECTOR

The present application is based on, and claims priority from JP Application Serial Number 2018-247459, filed Dec. 28, 2018, the disclosure of which is hereby incorporated by reference herein in its entirety.

BACKGROUND

1. Technical Field

The present disclosure relates to a light source device and a projector.

2. Related Art

In the past, there has been known a light source device provided with a solid-state light source for emitting excitation light, and a phosphor layer including a phosphor which is excited by the excitation light entering the phosphor and emits fluorescence longer in wavelength than the excitation light (see, e.g., JP-A-2011-129354 (Document 1)).

In the light source device described in Document 1, the phosphor layer is bonded to a radiator substrate with a bonding section, and the phosphor layer, the bonding section, and the radiator substrate constitute a wavelength conversion element. Such a wavelength conversion element is a reflective type wavelength conversion element for reflecting light emitted to an opposite side to the incident side of the excitation light toward the incident side of the excitation light with, for example, a reflecting surface of the radiator substrate and the bonding section.

As in the light source device described in Document 1, in the reflective type wavelength conversion element, it is necessary to reflect the fluorescence along the incident direction of the excitation light, the fluorescence having been emitted toward the radiator substrate out of the fluorescence having been generated in the phosphor layer. When such a reflective type wavelength conversion element has a configuration of reflecting the fluorescence with a reflecting surface disposed on a surface of a substrate for holding the phosphor layer, since the reflectance with respect to the fluorescence on the reflecting surface disposed on the surface of the substrate is not 100%, there occurs a light loss. Thus, there is a problem that the loss of the fluorescence increases.

SUMMARY

A light source device according to a first aspect of the present disclosure includes a light source configured to emit excitation light, a wavelength conversion section configured to perform wavelength conversion on the excitation light to generate fluorescence having a wavelength longer than a wavelength of the excitation light, a substrate opposed to the wavelength conversion section, and an air gap disposed between the wavelength conversion section and the substrate, wherein the wavelength conversion section has a first surface opposed to the substrate, the substrate has a second surface opposed to the first surface, a thickness dimension of the air gap as a dimension in a direction from the first surface toward the second surface is defined by a sum of a roughness of the first surface and a roughness of the second surface, and the thickness dimension is no smaller than a wavelength of the fluorescence.

In the first aspect described above, one of the first surface and the second surface may have a plurality of protruding parts, and the air gap may be formed by at least one of the protruding parts having contact with the other of the first surface and the second surface.

In the first aspect described above, the fluorescence may include a green light component, and the thickness dimension may be no smaller than 0.5 µm.

In the first aspect described above, the thickness dimension may be no larger than twice the wavelength of the fluorescence.

In the first aspect described above, the substrate may have a reflecting surface configured to reflect light emitted from the first surface.

In the first aspect described above, the substrate may have a dielectric multilayer opposed to the first surface.

The first aspect described above may further include a rotary section configured to rotate the substrate around a rotational axis along an incident direction of the excitation light with respect to the wavelength conversion section.

A projector according to a second aspect of the present disclosure includes a light source device described above, a light modulation device configured to modulate light emitted from the light source device in accordance with image information, and a projection optical device configured to project the light modulated by the light modulation device.

DESCRIPTION OF AN EXEMPLARY EMBODIMENT

An embodiment of the present disclosure will hereinafter be described based on the accompanying drawings.

Schematic Configuration of Projector

Figure 1:
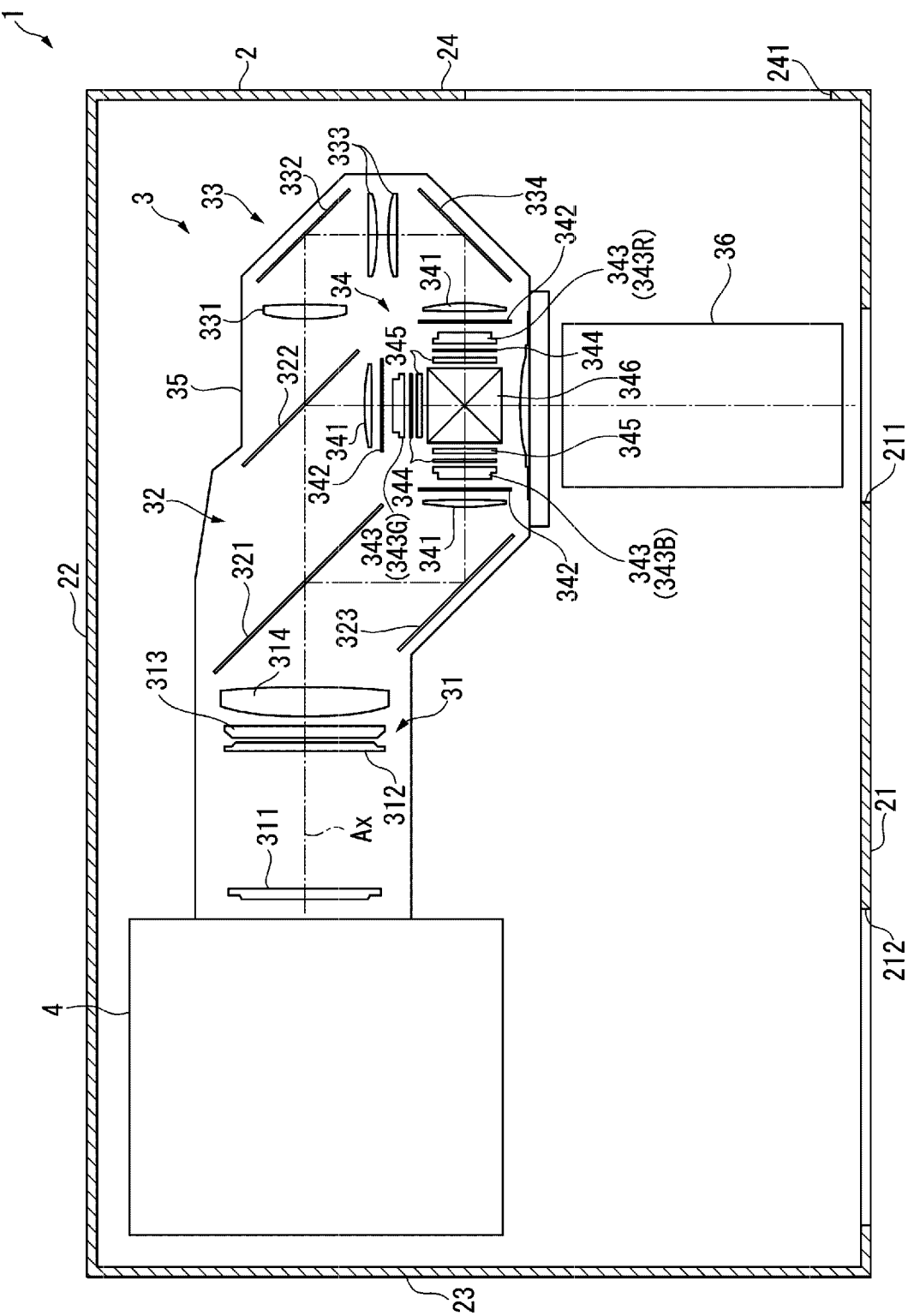
FIG. 1 is a schematic diagram showing a configuration of a projector in an embodiment.

FIG. 1 is a schematic diagram showing a configuration of a projector 1 according to the present embodiment.

The projector 1 according to the present embodiment is an image display device for modulating the light emitted from a light source device 4 described later to project image light for forming an image corresponding to image information on a projection target surface such as a screen in an enlarged manner. As shown in FIG. 1, the projector 1 is provided with an exterior housing 2 forming an exterior, and an image projection device 3 disposed in the exterior housing 2. Besides the above, although not shown in the drawing, the projector 1 is provided with a control device for controlling an operation of the projector 1, a power supply device for supplying electronic components with electrical power, and a cooling device for cooling a cooling target.

Configuration of Exterior Housing

The exterior housing 2 has a top surface part and a bottom surface part each not shown, a front surface part 21, a back surface part 22, a left side surface part 23 and a right side surface part 24, and is formed to have a substantially rectangular solid shape.

The front surface part 21 has an opening part 211 for exposing a part of a projection optical device 36 described later, and the image light to be projected by the projection optical device 36 passes through the opening part 211. Further, the front surface part 21 has an exhaust port 212 from which a cooling gas having cooled the cooling target in the projector 1 is discharged to the outside of the exterior housing 2.

The right side surface part 24 has an introduction port 241 from which a gas located outside the exterior housing 2 is introduced inside as the cooling gas.

Configuration of Image Projection Device

The image projection device 3 forms and then projects the image light described above. The image projection device 3 is provided with a light source device 4, a homogenizing device 31, a color separation device 32, a relay device 33, an image forming device 34, an optical component housing 35, and a projection optical device 36.

It should be noted that a configuration of the light source device 4 will be described later in detail.

The homogenizing device 31 homogenizes the light emitted from the light source device 4. The light thus homogenized by the homogenizing device 31 illuminates modulation areas of light modulation devices 343 described later of the image forming device 34 via the color separation device 32 and the relay device 33. The homogenizing device 31 is provided with two lens arrays 311, 312, a polarization conversion element 313, and a superimposing lens 314.

The color separation device 32 separates the light having entered the color separation device 32 from the homogenizing device 31 into colored light beams of red, green, and blue. The color separation device 32 is provided with two dichroic mirrors 321, 322, and a reflecting mirror 323 for reflecting the blue light beam having been separated by the dichroic mirror 321.

The relay device 33 is disposed on a light path of the red light beam longer than a light path of the blue light beam and a light path of the green light beam to suppress a loss of the red light beam. The relay device 33 is provided with an incident side lens 331, relay lenses 333, and reflecting mirrors 332, 334.

It should be noted that although the relay device 33 is disposed in the light path of the red light beam, this is not a limitation, and it is also possible to adopt a configuration in which, for example, the colored light beam longer in light path than other colored light beams is set to the blue light beam, and the relay device 33 is disposed on the light path of the blue light beam.

The image forming device 34 modulates each of the colored light beams of red, green, and blue having entered the image forming device 34, and combines the colored light beams thus modulated with each other to form the image light to be projected by the projection optical device 36. The image forming device 34 is provided with three field lenses 341, three incident side polarization plates 342, three light modulation devices 343, three view angle compensation plates 344, and three exit side polarization plates 345 each disposed in accordance with the respective colored light beams entering the image forming device 34, and a single color combining device 346.

The light modulation devices 343 each modulate the light emitted from the light source device 4 in accordance with the image information. The light modulation devices 343 include the light modulation device 343R for modulating the red light beam, the light modulation device 343G for modulating the green light beam, and the light modulation device 343B for modulating the blue light beam. In the present embodiment, the light modulation devices 343 are each formed of a transmissive liquid crystal panel, and the incident side polarization plate 342, the light modulation device 343, and the exit side polarization plate 345 constitute a liquid crystal light valve.

The color combining device 346 combines the colored light beams respectively modulated by the light modulation devices 343B, 343G, and 343R with each other to form the image light described above. In the present embodiment, the color combining device 346 is formed of a cross dichroic prism, but this is not a limitation, and it is also possible for the color combining device 346 to be formed of, for example, a plurality of dichroic mirrors.

The optical component housing 35 houses the homogenizing deice 31, the color separation device 32, the relay deice 33, and the image forming device 34 each described above inside. It should be noted that an illumination light axis Ax as a design optical axis is set in the image projection device 3, and the optical component housing 35 holds the homogenizing device 31, the color separation device 32, the relay device 33, and the image forming device 34 at predetermined positions on the illumination light axis Ax. The light source device 4 and the projection optical device 36 are disposed at predetermined positions on the illumination light axis Ax.

The projection optical device 36 projects the image light entering the projection optical device 36 from the image forming device 34, on the projection target surface in an enlarged manner. In other words, the projection optical device 36 projects the light beams having respectively been modulated by the light modulation devices 343B, 343G, and 343R. The projection optical device 36 is configured as, for example, a combination lens composed of a plurality of lenses housed in a lens tube having a cylindrical shape.

Configuration of Light Source Device

Figure 2:
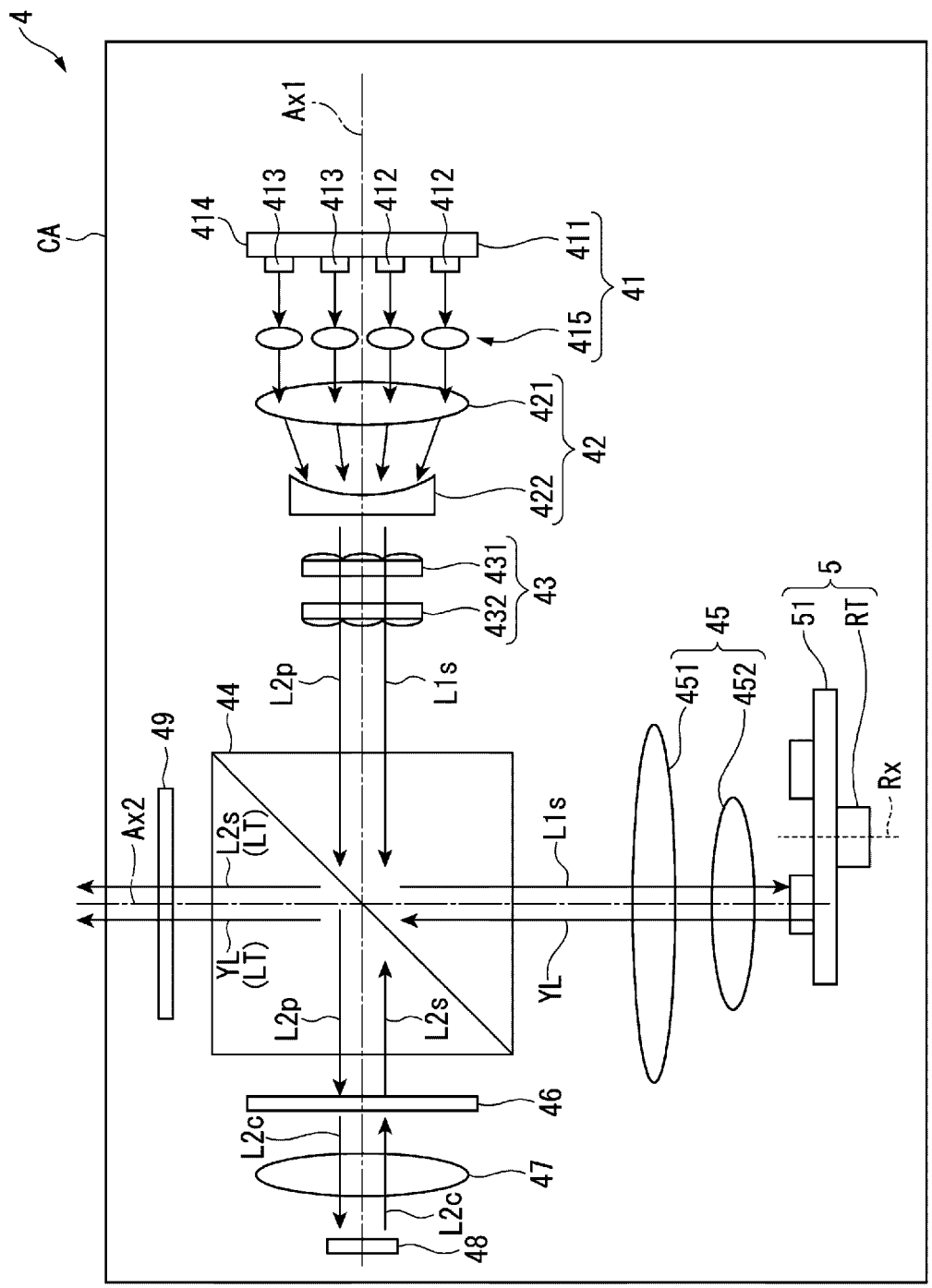
FIG. 2 is a schematic diagram showing a configuration of a light source device in the embodiment.

FIG. 2 is a schematic diagram showing a configuration of the light source device 4.

The light source device 4 emits the illumination light LT for illuminating the light modulation devices 343 to the homogenizing device 31. As shown in FIG. 2, the light source device 4 is provided with a light source housing CA, and a light source section 41, an afocal optical element 42, a homogenizer optical element 43, a polarization split element 44, a first light collection element 45, a first retardation element 46, a second light collection element 47, a diffusely reflecting device 48, a second retardation element 49, and a wavelength conversion device 5 each housed in the light source housing CA.

The light source housing CA is a sealed housing difficult for dust or the like to enter the inside thereof.

The light source section 41, the afocal optical element 42, the homogenizer optical element 43, the polarization split element 44, the first retardation element 46, the second light collection element 47, and the diffusely reflecting device 48 are arranged on the illumination light axis Ax1 set in the light source device 4.

The wavelength conversion device 5, the first light collection element 45, the polarization split element 44, and the second retardation element 49 are arranged on an illumination light axis Ax2 which is set in the light source device 4, and is perpendicular to the illumination light axis Ax1.

Configuration of Light Source Section

The light source section 41 is provided with a light source 411 for emitting the light, and collimator lenses 415.

The light source 411 is provided with a plurality of first solid-state light sources 412 and a plurality of second solid-state light sources 413 as light emitting elements, and a support member 414.

The first solid-state light sources 412 are each a semiconductor laser for emitting blue light L1$s$, which is s-polarized light, as excitation light. The blue light L1$s$ is, for example, a laser beam with a peak wavelength of 440 nm. The blue light L1$s$ having been emitted from the first solid-state light sources 412 enters the wavelength conversion device 5.

The second solid-state light sources 413 are each a semiconductor laser for emitting blue light L2$p$, which is p-polarized light. The blue light L2$p$ is, for example, a laser beam with a peak wavelength of 460 nm. The blue light L2$p$ having been emitted from the second solid-state light sources 413 enters the diffusely reflecting device 48.

The support member 414 supports the plurality of first solid-state light sources 412 and the plurality of second solid-state light sources 413 each arranged in an array in a plane perpendicular to the illumination light axis Ax1. The support member 414 is a metallic member having thermal conductivity.

The blue light L1$s$ having been emitted from the first solid-state light sources 412 and the blue light L2$p$ having been emitted from the second solid-state light sources 413 are converted by the collimator lenses 415 into parallel light beams, and then enter the afocal optical element 42.

It should be noted that in the present embodiment, the light source 411 has a configuration of emitting the blue light L1$s$ as the s-polarized light and the blue light L2$p$ as the p-polarized light. However, this is not a limitation, and the light source 411 can also be provided with a configuration of emitting blue light beams, which are linearly polarized light beams the same in polarization direction. In this case, it is sufficient to dispose a retardation element, which changes one type of linearly polarized light having entered the retardation element to light including s-polarized light and p-polarized light, between the light source section 41 and the polarization split element 44.

Configuration of Afocal Optical Element and Homogenizer Optical Element

The afocal optical element 42 adjusts the beam diameter of the blue light L1$s$, L2$p$ which enters the afocal optical element 42 from the light source section 41, and then makes the blue light L1$s$, L2$p$ enter the homogenizer optical element 43. The afocal optical element 42 is constituted by a lens 421 for collecting the incident light, and a lens 422 for collimating the light beam collected by the lens 421.

The homogenizer optical element 43 homogenizes the illuminance distribution of the blue light L1$s$, L2$p$. The homogenizer optical element 43 is formed of a pair of multi-lens arrays 431, 432.

Configuration of Polarization Split Element

The blue light L1$s$, L2$p$ having passed through the homogenizer optical element 43 enters the polarization split element 44.

The polarization split element 44 is a prism-type polarization beam splitter, and separates an s-polarization component and a p-polarization component included in the incident light from each other. Specifically, the polarization split element 44 reflects the s-polarization component, and transmits the p-polarization component. Further, the polarization split element 44 has a color separation characteristic of transmitting light with the wavelength no shorter than a predetermined wavelength irrespective of whether the light is the s-polarization component or the p-polarization component. Therefore, the blue light L1$s$ as the s-polarized light is reflected by the polarization split element 44, and then enters the first light collection element 45. Meanwhile, the blue light L2$p$ as the p-polarized light is transmitted through the polarization split element 44, and then enters the first retardation element 46.

Configuration of First Light Collection Element

The first light collection element 45 converges the blue light L1$s$ having been reflected by the polarization split element 44 on the wavelength conversion device 5. Further, the first light collection element 45 collimates fluorescence YL entering the first light collection element 45 from the wavelength conversion device 5. Although the first light collection element 45 is constituted by two lenses 451, 452 in the example shown in FIG. 2, the number of the lenses constituting the first light collection element 45 does not matter.

Configuration of Wavelength Conversion Device

The wavelength conversion device 5 is excited by the light entering the wavelength conversion device 5, and emits light having a wavelength different from the wavelength of the light having entered the wavelength conversion device 5 to the first light collection element 45. In other words, the wavelength conversion device 5 converts the wavelength of the incident light.

In the present embodiment, the wavelength conversion device 5 is provided with a wavelength conversion element 51 for emitting the fluorescence YL having the wavelength longer than the wavelength of the blue light L1$s$ in response to incidence of the blue light L1$s$ as the excitation light, and a rotary section RT for rotating the wavelength conversion element 51 around a rotational axis parallel to the illumination light axis Ax2 as a predetermined rotational axis. It should be noted that the rotational axis of the wavelength conversion element 51 is a rotational axis along the incident direction of the blue light L1$s$ as the excitation light.

Among these, the wavelength conversion element 51 is a reflective wavelength conversion element for emitting the fluorescence YL toward the incident side of the blue light L1$s$. It should be noted that the fluorescence YL is, for example, light having a peak wavelength in a range of 500 nm through 700 nm. In other words, the fluorescence YL includes a green light component.

The configuration of such a wavelength conversion element 51 will be described later in detail.

The fluorescence YL having been emitted from the wavelength conversion device 5 passes through the first light collection element 45 along the illumination light axis Ax2, and then enters the polarization split element 44. Then, the fluorescence YL passes through the polarization split element 44 along the illumination light axis Ax2, and then enters the second retardation element 49.

Configuration of First Retardation Element and Second Light Collection Element

The first retardation element 46 is disposed between the polarization split element 44 and the second light collection element 47. The first retardation element 46 converts the blue light L2$p$ having passed through the polarization split element 44 into blue light L2$c$ as circularly polarized light. The blue light L2$c$ enters the second light collection element 47.

The second light collection element 47 converges the blue light L2$c$ entering the second light collection element 47 from the first retardation element 46 on the diffusely reflecting device 48. Further, the second light collection element 47 collimates the blue light L2$c$ entering the second light collection element 47 from the diffusely reflecting device 48. It should be noted that the number of lenses constituting the second light collection element 47 can arbitrarily be changed.

Configuration of Diffusely Reflecting Device

The diffusely reflecting device 48 diffusely reflects the blue light L2c having entered the diffusely reflecting device 48 at substantially the same diffusion angle as that of the fluorescence YL emitted from the wavelength conversion device 5. As a configuration of the diffusely reflecting device 48, there can be illustrated a configuration provided with a reflecting plate for performing Lambertian reflection on the blue light L2c having entered the reflecting plate, and a rotary device for rotating the reflecting plate around a rotational axis parallel to the illumination light axis Ax1.

The blue light L2c having diffusely been reflected by the diffusely reflecting device 48 passes through the second light collection element 47, and then enters the first retardation element 46. The blue light L2c is converted into circularly polarized light with the opposite rotational direction when reflected by the diffusely reflecting device 48. Therefore, the blue light L2c having entered the first retardation element 46 via the second light collection element 47 is not converted into the blue light L2p as the p-polarized light at the moment when having entered the first retardation element 46 from the polarization split element 44, but is converted into the blue light L2s as the s-polarized light. Then, the blue light L2s is reflected by the polarization split element 44 to enter the second retardation element 49. Therefore, the light which enters the second retardation element 49 from the polarization split element 44 is white light having the blue light L2s and the fluorescence YL mixed with each other.

Configuration of Second Retardation Element

The second retardation element 49 converts the white light entering the second retardation element 49 from the polarization split element 44 into light having s-polarized light and p-polarized light mixed with each other. The illumination light LT as the white light having been converted in such a manner enters the homogenizing device 31 described above.

Configuration of Wavelength Conversion Element

Figure 3:
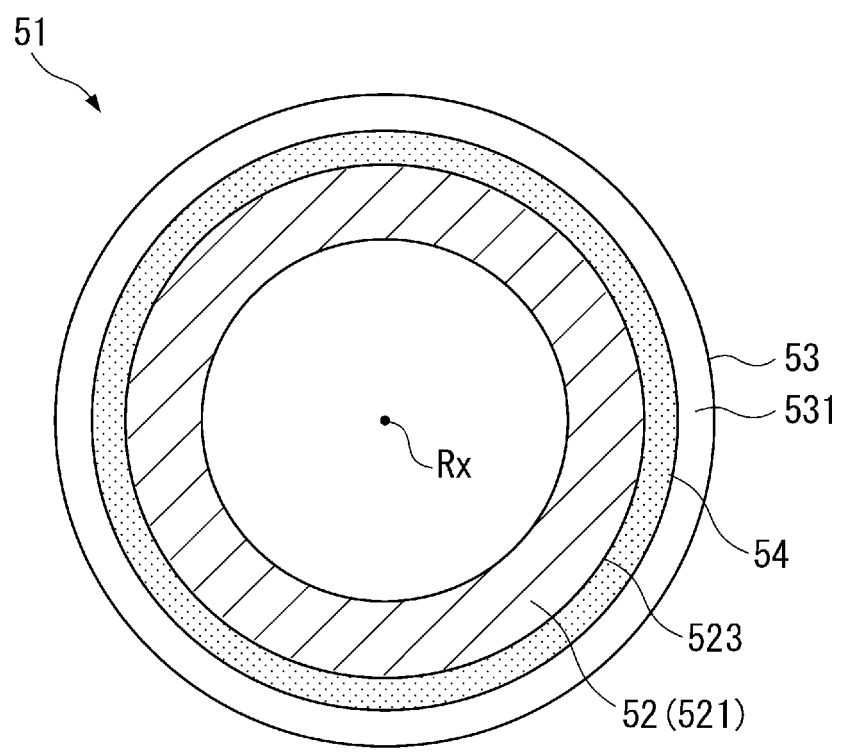
FIG. 3 is a plan view of a wavelength conversion element in the embodiment viewed from an incident side of excitation light.
Figure 4:
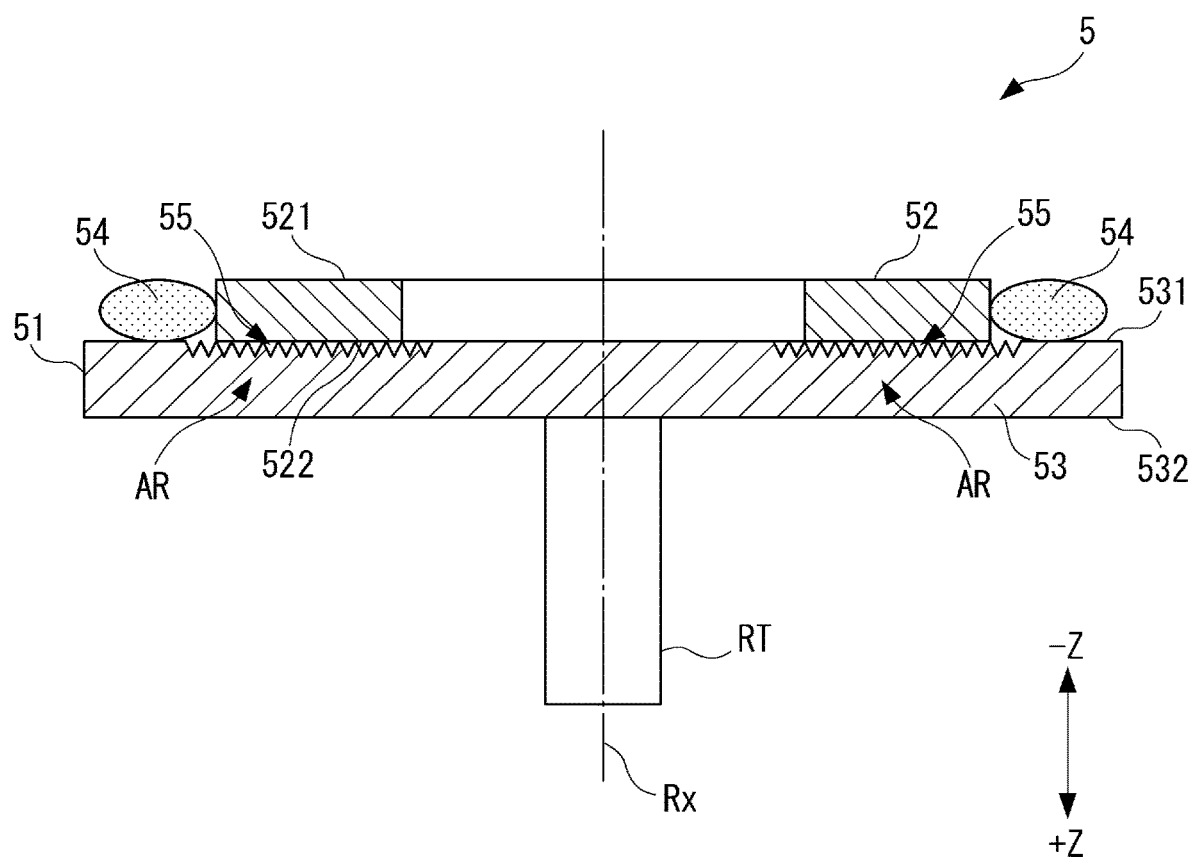
FIG. 4 is a schematic diagram showing a cross-sectional surface of the wavelength conversion element in the embodiment.

FIG. 3 is a plan view of the wavelength conversion element 51 viewed from the incident side of the excitation light. FIG. 4 is a diagram schematically showing a cross-section of the wavelength conversion element 51.

The wavelength conversion element 51 is a reflective wavelength conversion element for emitting the fluorescence as the light having a different wavelength from the wavelength of the excitation light toward the incident side of the excitation light. As shown in FIG. 3 and FIG. 4, the wavelength conversion element 51 has a wavelength conversion section 52, a substrate 53, an adhesive 54 for bonding the wavelength conversion section 52 to the substrate 53, and an air gap 55 disposed between the wavelength conversion section 52 and the substrate 53.

It should be noted that in the following description and the drawings, the blue light L1s entering the wavelength conversion section 52 is described as excitation light for exciting the phosphor included in the wavelength conversion section 52. Further, the incident direction of the excitation light to the wavelength conversion section 52 is defined as a +Z direction, and an opposite direction to the +Z direction is defined as a −Z direction.

Configuration of Wavelength Conversion Section

The wavelength conversion section 52 is disposed on the −Z direction side as the incident side of the excitation light with respect to the substrate 53, and is held by the substrate 53 with the adhesive 54. The wavelength conversion section 52 converts the excitation light entering the wavelength conversion section 52 into fluorescence, and then emits the fluorescence. In the detailed description, the wavelength conversion section 52 perform the wavelength conversion on the excitation light entering the wavelength conversion section 52 to generate and then emit the fluorescence as the light having a longer wavelength than the wavelength of the excitation light. As shown in FIG. 3, the wavelength conversion section 52 is formed to have an annular shape centered on the rotational axis Rx of the wavelength conversion element 51 when viewed from the −Z direction.

As shown in FIG. 4, the wavelength conversion section 52 has a first surface 521 as a surface on the −Z direction side, and a second surface 522 as a surface on the +Z direction side, and on an opposite side to the first surface 521.

The first surface 521 is a plane of incidence which the excitation light enters, and is also an exit surface from which the fluorescence is emitted.

The second surface 522 is an opposed surface opposed to the substrate 53, and corresponds to a first surface of a wavelength conversion section in the present disclosure.

The wavelength conversion section 52 is a ceramic obtained by calcining a phosphor raw material. In the present embodiment, the wavelength conversion section 52 is obtained by mixing Ce as an activator agent with yttrium, alumina, or garnet as a YAG phosphor material added with an activator agent to be the center of the light emission, then calcining the mixture at high temperature, and then grinding the result into a thin plate. As the phosphor ceramic, there can be cited a ceramic mainly having, for example, a garnet structure. As a ceramic having the garnet structure, there can be cited a composition including at least one of $Y_3Al_5O_{12}$, $TbAl_5O_{12}$, and $LuAl_5O_{12}$. It should be noted that the wavelength conversion section 52 can include a ceramic having a perovskite structure or a monolithic structure besides the ceramic having the garnet structure. Further, in order to increase extraction efficiency of the fluorescence from the wavelength conversion section 52, it is possible for the wavelength conversion section 52 to include fine air holes.

Configuration of Substrate

As shown in FIG. 3, the substrate 53 is formed to have a disk-like shape viewed from the −Z direction, and is rotated together with the wavelength conversion section 52 around the rotational axis Rx by the rotary section RT. The substrate 53 is a holding member for holding the wavelength conversion section 52, and in addition, the substrate 53 is also a radiator member for radiating the heat transferred from the wavelength conversion section 52. As shown in FIG. 4, the substrate 53 has a first surface 531 as a surface on the −Z direction side, and a second surface 532 as a surface on the +Z direction side, and on an opposite side to the first surface 531.

The first surface 531 is an opposed surface opposed to the wavelength conversion section 52, and corresponds to a second surface of a substrate in the present disclosure. The first surface 531 is provided with a plurality of fine protruding parts 5311 (see FIG. 5) and a plurality of fine recessed parts 5312 (see FIG. 5). These will be described later in detail.

It is also possible for the second surface 532 to be provided with a radiator section which is increased in contact area with the ambient gas to thereby increase the radiation efficiency of the heat transferred to the substrate 53.

The substrate 53 has a substrate main body 53A, and a reflecting film 53B and a dielectric multilayer 53C both disposed on the substrate main body 53A.

The substrate main body 53A is formed to have a disk-like shape with, for example, a metal material including at least either one of copper and aluminum.

The reflecting film 53B is formed on a substantially entire area of the surface on the −Z direction side in the substrate main body 53A with a metal film made of, for example, aluminum or silver. In other words, the substrate 53 has a reflecting surface RS formed of the reflecting film 53B, and reflecting light emitted from the second surface 522 of the wavelength conversion section 52.

It should be noted that when the substrate main body 53A itself has a reflective property for reflecting the incident light, the reflecting film 53B can be eliminated. Further, the reflecting film 53B is not required to be formed on the substantially entire area of the surface on the −Z direction side in the substrate main body 53A, and can be disposed only on a region opposed to the wavelength conversion section 52 in the surface on the −Z direction side in the substrate main body 53A.

The dielectric multilayer 53C is a film having, for example, a plurality of layers formed of $SiO_2$ and a plurality of layers formed of $TiO_2$ alternately stacked on one another. In other words, the dielectric multilayer 53C has a configuration having dielectric films of two types different in refractive index from each other alternately stacked on one another. The number of layers of the dielectric films constituting the dielectric multilayer 53C is not particularly limited. Such a dielectric multilayer 53C is disposed so as to cover the reflecting surface RS.

Specifically, when the reflecting film 53B is provided to the substrate main body 53A, the dielectric multilayer 53C is disposed so as to cover the reflecting film 53B on the −Z direction side. Further, when the reflecting film 53B is not provided to the substrate main body 53A, the dielectric multilayer 53C is disposed on the surface on the −Z direction side in the substrate main body 53A. In other words, the dielectric multilayer 53C constitutes the first surface 531 of the substrate 53.

It should be noted that in the substrate 53, the dielectric multilayer 53C is not an essential constituent, and in the substrate 53, the reflecting film 53B is not an essential constituent.

Therefore, when the substrate 53 has the dielectric multilayer 53C, a surface on the −Z direction side in the dielectric multilayer 53C forms the first surface 531. Further, when the substrate 53 does not have the dielectric multilayer 53C, a surface on the −Z direction side in the reflecting film 53B forms the first surface 531. Further, when the substrate 53 does not have each of the dielectric multilayer 53C and the reflecting film 53B, a surface on the −Z direction side in the substrate main body 53A forms the first surface 531. In other words, regardless of the configuration of the substrate 53, the surface on the −Z direction side in the substrate 53, and at the same time, the surface opposed in the −Z direction to the wavelength conversion section 52 corresponds to the first surface 531.

Configuration of Adhesive

The adhesive 54 bonds the wavelength conversion section 52 to the substrate 53 to make the substrate 53 hold the wavelength conversion section 52. As shown in FIG. 3, the adhesive 54 is disposed to have an annular shape along the outer edge of the wavelength conversion section 52 formed to have an annular shape when viewed from the −Z direction, and connects the first surface 531 of the substrate 53 and the outer circumferential surface 523 centered on the rotational axis Rx in the wavelength conversion section 52 to each other. Therefore, in the wavelength conversion element 51 in the present embodiment, the adhesive 54 is not disposed between the second surface 522 of the wavelength conversion section 52 and the first surface 531 of the substrate 53.

It should be noted that it is also possible for the adhesive 54 to be disposed along the inner edge of the wavelength conversion section 52. In other words, it is sufficient for the adhesive 54 to be able to fix the wavelength conversion section 52 to the substrate 53 so that the second surface 522 of the wavelength conversion section 52 is opposed to the first surface 531 of the substrate 53, and the position of the adhesive 54 does not matter.

When using, for example, a silicone adhesive as the adhesive 54, it is possible for the adhesive 54 to absorb the stress caused by a change in dimension due to heat generation in accordance with a difference in linear expansion coefficient between the wavelength conversion section 52 made of ceramics and the substrate 53 made of metal.

Configuration of Air Gap

Figure 5:
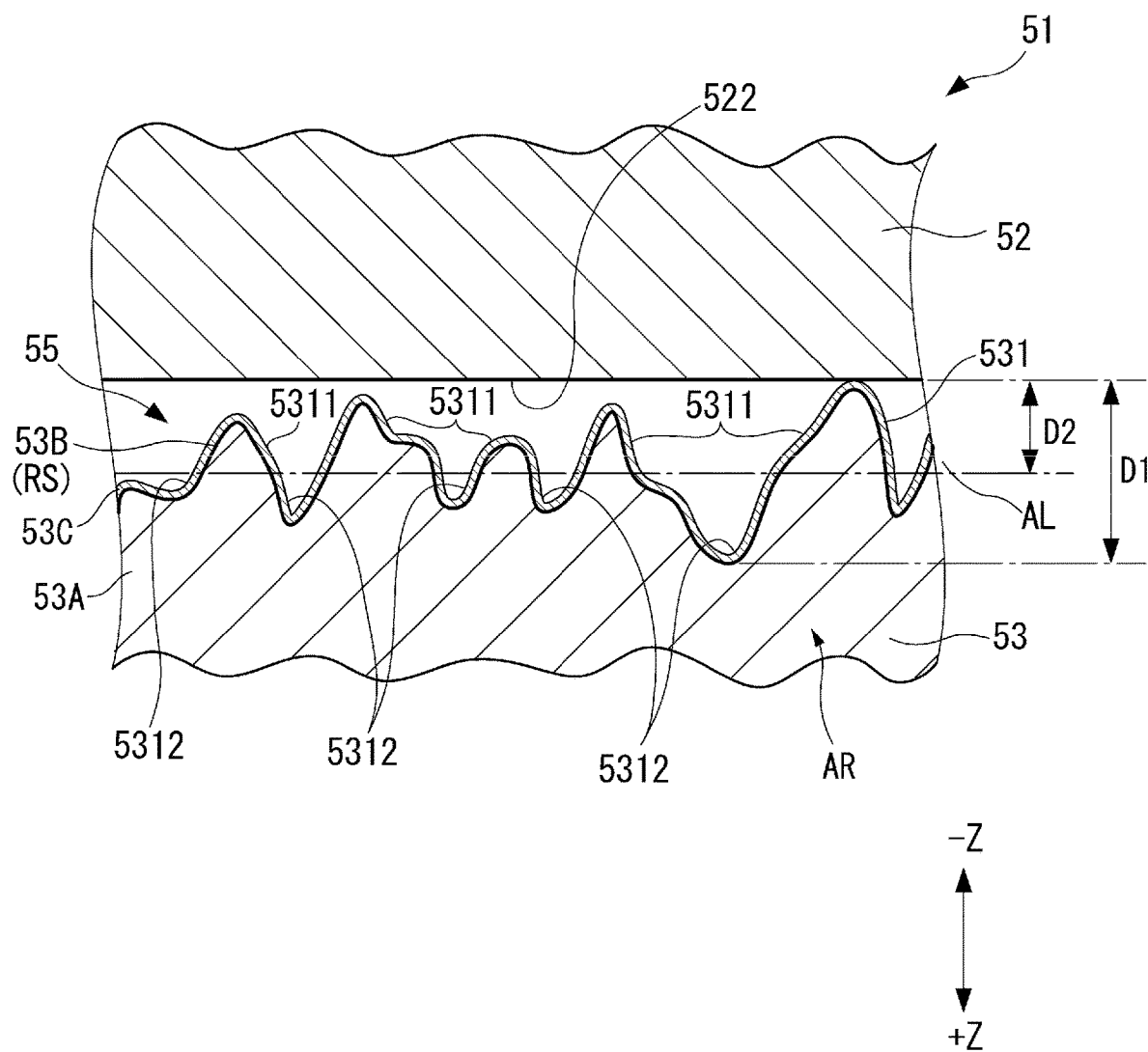
FIG. 5 is a cross-sectional view showing a part of the wavelength conversion element in the embodiment in an enlarged manner.

FIG. 5 is a cross-sectional view showing a part of the wavelength conversion element 51 in an enlarged manner.

An opposed region AR opposed to the wavelength conversion section 52 in the first surface 531 of the substrate 53 has the plurality of fine protruding parts 5311 and the plurality of fine recessed parts 5312 formed by, for example, polishing as shown in FIG. 5. Specifically, the plurality of protruding parts 5311 and the plurality of recessed parts 5312 are formed on the first surface 531 by polishing the substrate main body 53A to form the reflecting film 53B and the dielectric multilayer 53C, as needed, on the substrate main body 53A thus polished.

Therefore, by at least one of the protruding parts 5311 having contact with the second surface 522 of the wavelength conversion section 52, the air gap 55 is disposed between the second surface 522 of the wavelength conversion section 52 and the first surface 531 of the substrate 53.

It should be noted that it is also possible to form the plurality of protruding parts 5311 and the plurality of recessed parts 5312 by polishing the substrate main body 53A provided with at least one of the reflecting film 53B and the dielectric multilayer 53C.

Here, when the excitation light enters the first surface 521 of the wavelength conversion section 52, the fluorescence is diffusely emitted inside the wavelength conversion section 52.

The fluorescence proceeding inside the wavelength conversion section 52 toward the −Z direction is emitted from the first surface 521 toward the −Z direction.

A part of the fluorescence proceeding inside the wavelength conversion section 52 toward the +Z direction is emitted from the second surface 522 toward the substrate 53. The fluorescence having entered the substrate 53 is reflected by the dielectric multilayer 53C or the reflecting film 53B to thereby enter the wavelength conversion section 52 via the second surface 522, and then proceeds inside the wavelength conversion section 52 toward the −Z direction.

In contrast, the air gap 55 is disposed between the second surface 522 and the first surface 531 so that the light entering the second surface 522 from the inside of the wavelength conversion section 52 with an incident angle exceeding the critical angle is totally reflected by the second surface 522.

Therefore, since the air gap 55 is disposed between the wavelength conversion section 52 and the substrate 53, another part of the fluorescence proceeding inside the wavelength conversion section 52 toward the +Z direction is totally reflected by the second surface 522 to proceed toward the −Z direction, and is changed in the proceeding direction at the air hole located inside, and is finally emitted from the first surface 521.

Thickness Dimension of Air Gap

The thickness dimension as the dimension in the +Z direction of the air gap 55 is defined by a sum of the roughness of the second surface 522 in the wavelength conversion section 52 and the roughness of the first surface 531 in the substrate 53. Specifically, the thickness dimension of the air gap 55 is defined by a sum of the maximum height roughness Rz of the second surface 522 and the maximum height roughness Rz of the opposed region AR in the first surface 531.

It should be noted that the maximum height roughness Rz of the second surface 522 when polishing the wavelength conversion section 52 is several nanometers, and is extremely small compared to the maximum height roughness Rz of the first surface 531. Therefore, since the maximum height roughness Rz of the second surface 522 is negligible, the thickness dimension D1 of the air gap 55 is defined by the maximum height roughness Rz of the first surface 531 in the present embodiment.

Here, the maximum height roughness Rz is defined by the JIS (Japanese Industrial Standard) standard, and is a sum of a maximum value of a peak height and a maximum value of a bottom depth of the profile curve in a reference length. It should be noted that instead of the maximum height roughness Rz, it is possible to adopt the maximum height roughness Rt which is similarly defined by the JIS standard, and is the sum of the maximum value of the peak height and the maximum value of the bottom depth of the profile curve in an evaluation length.

Further, in the present embodiment, the thickness dimension D1 of the air gap 55 is a value within a range no smaller than the wavelength of the fluorescence generated in the wavelength conversion section 52, and no larger than a value twice as much as the wavelength of the fluorescence. Since the green light component is included in the fluorescence generated by the wavelength conversion section 52, the thickness dimension D1 of the air gap 55 is a value within a range no smaller than 0.5 μm and no larger than 1.0 μm.

Further, a dimension in the +Z direction from an average line of the profile curve of the second surface 522 to an average line of the profile curve of the first surface 531 is a value within the range no smaller than the wavelength of the fluorescence generated in the wavelength conversion section 52, and no larger than the value twice as much as the wavelength of the fluorescence. In the present embodiment, since the second surface 522 can be assumed as a substantially flat surface, a dimension D2 in the +Z direction from the second surface 522 to the average line AL of the profile curve of the first surface 531 is a value within a range no smaller than 0.5 μm and no larger than 1.0 μm.

These ranges are set for the following reason.

Figure 6:
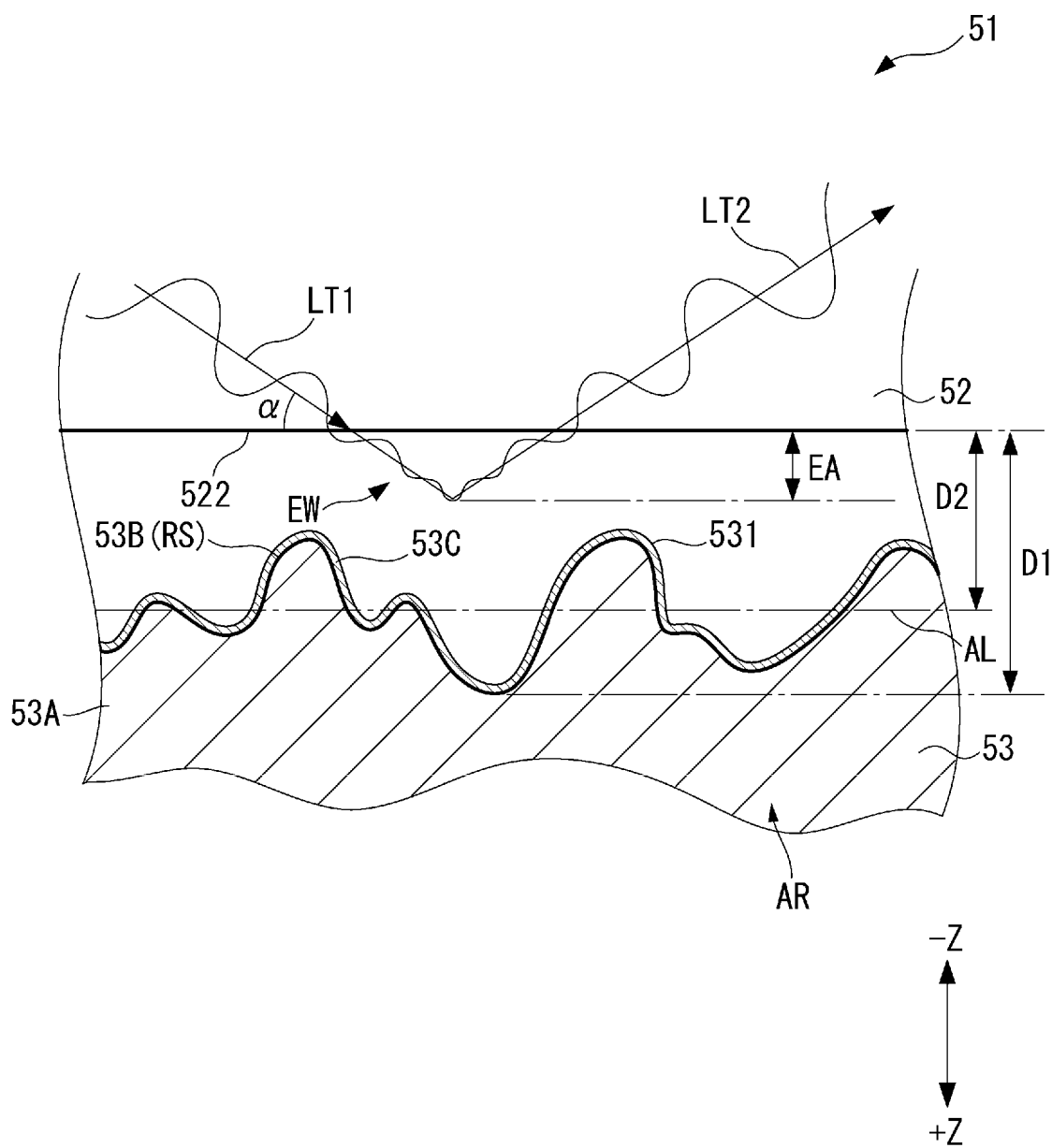
FIG. 6 is a diagram schematically showing a light path of light internally reflected by a second surface of a wavelength conversion section in the embodiment.

FIG. 6 is a diagram schematically showing the light path in which the incident light LT1 entering the second surface 522 with the incident angle α exceeding the critical angle is internally reflected by the second surface 522.

As shown in FIG. 6, the incident light LT1 having entered the second surface 522 with the incident angle α exceeding the critical angle out of the incident light entering the second surface 522 from the inside of the wavelength conversion section 52 is internally reflected by the second surface 522 to turn to the reflected light LT2, and then proceeds inside the wavelength conversion section 52.

On this occasion, the energy of the incident light LT1 does not always exist inside the wavelength conversion section 52, but is leaked as an evanescent wave EW from the second surface 522 to the air gap 55, then returns to the inside of the wavelength conversion section 52, then turns to the reflected light LT2 internally reflected by the second surface 522, and then proceeds. On the second surface 522, there occurs a Goos-Hanchen shift in which the exit position of the reflected light LT2 is shifted from the incident position of the incident light LT1. As described above, the evanescent wave EW leaked to the air gap 55 proceeds from the second surface 522 to the outside as much as the wavelength of the evanescent wave EW, and then returns to the inside of the wavelength conversion section 52 via the second surface 522. Specifically, the incident light LT1 proceeds from the second surface 522 to the outside as much as the wavelength of the excitation light when the incident light LT1 is the excitation light, or proceeds from the second surface 522 to the outside as much as the wavelength of the fluorescence when the incident light LT1 is the fluorescence, and then returns to the inside of the wavelength conversion section 52.

Therefore, when a constituent having a light absorbing property exists in an evanescent area EA as an area where the evanescent wave EW occurs, at least a part of the light energy is absorbed by the constituent.

When the light energy is absorbed in such a manner, the wavelength conversion efficiency defined by the light intensity of the fluorescence to be emitted with respect to the light intensity of the incident excitation light decreases in the wavelength conversion element 51.

On the other hand, the thickness dimension D1 of the air gap 55 and the dimension D2 are each a value longer than the wavelength of the fluorescence. Specifically, the thickness dimension D1 of the air gap 55 and the dimension D2 are each a value no smaller than 0.5 μm. According to this configuration, it is possible to prevent the evanescent wave having been leaked from the second surface 522 from entering the first surface 531. Therefore, since it is possible to prevent the energy of the excitation light and the fluorescence from being absorbed by the substrate 53, the fluorescence emitted from the wavelength conversion section 52 is prevented from being lost.

Further, the dimensions D1, D2 are each a value no larger than 1.0 μm as the value twice as much as the wavelength of the fluorescence. According to this configuration, it is possible to transfer the heat generated in the wavelength conversion section 52 to the substrate 53 via the air gap 55. Therefore, it is possible to transfer the heat of the wavelength conversion section 52 to radiate the heat to the substrate 53, and thus, it is possible to suppress rise in temperature of the wavelength conversion section 52.

Advantages of Embodiment

According to the projector 1 related to the present embodiment described hereinabove, the following advantages can be exerted.

The light source device 4 is provided with the light source 411 for emitting the excitation light, the wavelength conversion section 52 of converting the wavelength of the excitation light to generate the fluorescence having a longer wavelength than the wavelength of the excitation light, the substrate 53 opposed to the wavelength conversion section 52, and the air gap 55 disposed between the wavelength conversion section 52 and the substrate 53. The wavelength conversion section 52 has the second surface 522 as the first surface opposed to the substrate 53, and the substrate 53 has the first surface 531 as the second surface opposed to the second surface 522. The thickness dimension D1 of the air gap 55 in the +Z direction as the direction from the second surface 522 toward the first surface 531 is defined by the sum of the roughness of the second surface 522 and the roughness of the first surface 531, and the thickness dimension D1 is no shorter than the wavelength of the fluorescence. Further, the projector 1 is provided with the light source device 4, the light modulation device 343 for modulating the light emitted from the light source device 4 in accordance with the image information, and the projection optical device 36 for projecting the light modulated by the light modulation device 343.

According to such a configuration, due to the air gap 55, it is possible to prevent the light entering the second surface 522 at an angle exceeding the critical angle from the inside of the wavelength conversion section 52 from being emitted from the second surface 522 toward the substrate 53. Therefore, it is possible to prevent the light from entering the substrate 53 to partially be lost, and by extension, it is possible to prevent the fluorescence emitted from the wavelength conversion section 52 from being lost. Therefore, it is possible to prevent the wavelength conversion efficiency from being deteriorated by the wavelength conversion section 52.

Further, the thickness dimension D1 of the air gap 55 is defined by the roughness of the second surface 522 and the roughness of the first surface 531. In other words, the air gap 55 is formed by the roughness of the second surface 522 and the roughness of the first surface 531. Therefore, compared to when disposing the air gap 55 by disposing a spacer or the like between the second surface 522 and the first surface 531, it is possible to easily provide the air gap 55, and in addition, it is possible to form the air gap 55 having a smaller thickness dimension.

The thickness dimension D1 of the air gap 55 is no smaller than the wavelength of the fluorescence, and the dimension in the +Z direction from the second surface 522 to the average line AL of the profile curve of the first surface 531 is also no smaller than the wavelength of the fluorescence. According to this configuration, it is possible to prevent the evanescent wave EW having been leaked from the second surface 522 from entering the substrate 53. Therefore, since it is possible to prevent the energy of the light from being absorbed by the substrate 53, it is possible to prevent the fluorescence generated in the wavelength conversion section 52 and then emitted therefrom from being lost.

The first surface 531 has the plurality of protruding parts 5311. The air gap 55 is formed between the second surface 522 and the first surface 531 by at least one of the protruding parts 5311 having contact with the second surface 522 opposed to the first surface 531.

According to such a configuration, it is possible to keep the air gap 55, and in addition, it is possible to easily form the air gap 55.

The fluorescence generated by the wavelength conversion section 52 includes the green light component. Further, the thickness dimension D1 of the air gap 55 is no smaller than 0.5 µm.

According to such a configuration, since the thickness dimension of the air gap 55 is no smaller than 0.5 µm, namely no smaller than 500 nm, it is possible to prevent the evanescent wave of the excitation light and the evanescent wave of the fluorescence from entering the substrate 53.

Therefore, it is possible to prevent a loss from occurring in the fluorescence emitted from the wavelength conversion section 52.

The thickness dimension D1 of the air gap 55 is no larger than the value twice as much as the wavelength of the fluorescence. In other words, the thickness dimension D1 of the air gap 55 is no smaller than the wavelength of the fluorescence and no larger than the value twice as much as the wavelength of the fluorescence. Specifically, the thickness dimension D1 of the air gap 55 is a value within a range no smaller than 0.5 µm and no larger than 1.0 µm.

According to such a configuration, as described above, it is possible to prevent the evanescent wave EW leaked from the second surface 522 from entering the substrate 53, and in addition, it is possible to transfer the heat of the wavelength conversion section 52 to the substrate 53. Therefore, it is possible to cool the wavelength conversion section 52.

The substrate 53 has the reflecting surface RS for reflecting the light emitted from the second surface 522 of the wavelength conversion section 52.

According to such a configuration, it is possible to return the excitation light and the fluorescence having been emitted from the second surface 522 to the wavelength conversion section 52 by reflecting the excitation light and the fluorescence with the reflecting surface RS. Therefore, it is possible to increase the wavelength conversion efficiency by the wavelength conversion section 52.

The substrate 53 has the dielectric multilayer 53C opposed to the second surface 522 of the wavelength conversion section 52, and for reflecting the light emitted from the second surface 522. The dielectric multilayer 53C is located on the incident side of the light to be emitted from the second surface 522 with respect to the reflecting surface RS.

According to such a configuration, it is possible to reflect a part of the light having been emitted from the second surface 522 with the dielectric multilayer 53C to enter the wavelength conversion section 52. Therefore, it is possible to increase the wavelength conversion efficiency by the wavelength conversion section 52. Further, it is possible to reduce the amount of light entering the reflecting surface RS and absorbed, and it is possible to prevent the loss from occurring in the fluorescence emitted from the wavelength conversion section 52, and by extension, the fluorescence emitted from the light source device 4.

The light source device 4 is provided with the rotary section RT for rotating the substrate 53 for holding the wavelength conversion section 52 around the rotational axis Rx along the +Z direction as the incident direction of the excitation light with respect to the wavelength conversion section 52.

According to such a configuration, since it is possible to move the position of the incident area of the excitation light in the wavelength conversion section 52, it is possible to prevent the temperature of the wavelength conversion section 52 from rising locally. Therefore, it is possible to prevent the wavelength conversion efficiency of the wavelength conversion section 52 from decreasing due to the heat.

Modifications of Embodiment

The present disclosure is not limited to the embodiment described above, but includes modifications, improvements, and so on in the range where the advantages of the present disclosure can be achieved.

In the embodiment described above, it is assumed that the wavelength conversion element 51 provided to the light source device 4 includes the wavelength conversion section 52 in which the phosphor and the activator agent are bound to each other with the glass binder. However, this is not a limitation, and the configuration of the wavelength conversion section 52 is not limited to the above providing the incident excitation light can be converted into light having a different wavelength from the wavelength of the excitation light.

For example, it is also possible for the wavelength conversion section 52 to be configured by binding phosphor particles for diffusely emitting the fluorescence with glass. In other words, it is also possible for the wavelength conversion section 52 to be formed of a glass phosphor including the phosphor particles and the activator agent.

As the phosphor particles, it is possible to adopt a KSF phosphor, an SCASN phosphor, or the like besides the YAG phosphor. It is also possible to adopt what is obtained by replacing Y in the YAG phosphor with Lu, Gd, or Ga. As the activator agent, it is possible to adopt at least one of Eu, Pr, Cr, Gd, and Ga besides Ce. Besides the above, it is also possible for the wavelength conversion section 52 to include air holes.

Further, for example, the wavelength conversion section 52 can also be what has the phosphor particles and the activator agent bound to each other with a resin binder instead of the glass binder. In this case, a silicone binder can be illustrated as the resin binder.

It should be noted that the phosphor particles and the activator agent are substantially the same as described above, and it is also possible for the wavelength conversion section 52 to include air holes inside.

Further, it is also possible to adopt an inorganic binder such as $Al_2O_3$ instead of the resin binder.

Even when these wavelength conversion sections 52 are adopted, the thickness dimension D1 of the air gap 55 is defined by the sum of the roughness of the second surface 522 of the wavelength conversion section 52 and the roughness of the first surface 531 of the substrate 53, and the thickness dimension D1 is a value within the range no smaller than the wavelength of the fluorescence generated in the wavelength conversion section 52, and no larger than the value twice as much as the wavelength of the fluorescence. The same as described above also applies to the dimension D2. It is also possible for the light source device 4 and the projector 1 provided with the wavelength conversion element 51 having such a wavelength conversion section 52 to exert substantially the same advantages as described above.

In the embodiment described above, it is assumed that the plurality of protruding parts 5311 and the plurality of recessed parts 5312 for forming the air gap 55 between the substrate 53 and the wavelength conversion section 52 are formed on the first surface 531 of the substrate 53 by polishing. However, this is not a limitation, and the method of forming the plurality of protruding parts and the plurality of recessed parts can also be other methods.

In the embodiment described above, it is assumed that the thickness dimension D1 of the air gap 55 is a value within the range no smaller than 0.5 µm and no larger than 1.0 µm. In other words, it is assumed that the thickness dimension D1 of the air gap 55 is a value within the range no smaller than the wavelength of the fluorescence generated by the wavelength conversion section 52, and no larger than the value twice as much as the wavelength of the fluorescence. However, this is not a limitation, and the thickness dimension can also be a value smaller than 0.5 µm, or can also be a value exceeding 1.0 µm. In other words, it is also possible for the thickness dimension D1 of the air gap 55 to be a value smaller than the wavelength of the fluorescence, or a value exceeding the wavelength twice as much as the wavelength of the fluorescence.

In the present embodiment described above, it is assumed that the dimension D2 in the +Z direction from the average line of the profile curve of the second surface 522 to the average line of the profile curve of the first surface 531 is a value within the range no smaller than the wavelength of the fluorescence generated in the wavelength conversion section 52, and no larger than the value twice as much as the wavelength of the fluorescence. However, this is not a limitation, and the dimension D2 can also be a value smaller than 0.5 µm, or can also be a value exceeding 1.0 µm. In other words, it is also possible for the dimension D2 to be a value smaller than the wavelength of the fluorescence, or a value exceeding the wavelength twice as much as the wavelength of the fluorescence.

In the embodiment described above, the description is presented assuming that the second surface 522 opposed to the substrate 53 in the wavelength conversion section 52 is a flat surface. However, this is not a limitation, it is also possible for the second surface 522 to have a plurality of protruding parts and a plurality of recessed parts formed by processing such as polishing, or a plurality of protruding parts and a plurality of recessed parts formed of the material of the wavelength conversion section 52 and formed in the manufacturing process of the wavelength conversion section 52.

Further, it is assumed that the air gap 55 is disposed between the wavelength conversion section 52 and the substrate 53 by the protruding parts 5311 provided to the substrate 53 having contact with the second surface 522. However, this is not a limitation, and it is also possible for the protruding parts to be provided to the wavelength conversion section. Further, the state in which the wavelength conversion section and the substrate do not have contact with each other can be maintained by an adhesive or the like.

In the embodiment described above, it is assumed that the substrate 53 has the reflecting surface RS for reflecting the incident light. However, this is not a limitation, and the substrate is not required to have the reflecting surface as described above. Further, even when the reflecting surface is provided, the reflecting surface is not required to be a reflecting surface formed by metal deposition.

In the embodiment described above, it is assumed that the substrate 53 has the dielectric multilayer 53C opposed to the second surface 522 of the wavelength conversion section 52, and for reflecting the light emitted from the second surface 522. However, this is not a limitation, and the dielectric multilayer 53C can be eliminated.

In contrast, a multilayer film having, for example, high refractive index materials $Nb_2O_5$ and low refractive index materials $SiO_2$ alternately stacked one another can also be disposed on the second surface 522 opposed to the substrate 53 in the wavelength conversion section 52. By disposing such a multilayer film, it becomes more efficient to take out the fluorescence from the wavelength conversion section 52.

In the embodiment described above, it is assumed that the wavelength conversion element 51 has the configuration of being rotated by the rotary section RT. However, this is not a limitation, and it is also possible to adopt a configuration in which the wavelength conversion element is not rotated. In other words, the wavelength conversion device is not required to be provided with the rotary section RT for rotating the wavelength conversion element. In this case, the wavelength conversion section 52 is not required to be formed to have an annular shape when viewed from the incident side of the excitation light, and can also be formed to have, for example, a circular shape, or a polygonal shape. Further, the shape of the wavelength conversion section 52 can also be a circular shape or a polygonal shape irrespective of whether or not the wavelength conversion section 52 is rotated.

In the embodiment described above, it is assumed that the projector 1 is equipped with the three light modulation devices 343 (343B, 343G, and 343R). However, this is not a limitation, and the present disclosure can also be applied to a projector equipped with two or less, or four or more light modulation devices.

In the embodiment described above, it is assumed that the projector 1 is provided with the light modulation devices 343 each having the transmissive type liquid crystal panel having the plane of incidence of light and the light emission surface different from each other. However, this is not a limitation, but it is also possible to adopt a configuration in which the light modulation device each have a reflective type liquid crystal panel having the plane of incidence of light and the light emission surface coinciding with each other. Further, it is also possible to use a light modulation device other than the liquid crystal device, such as a device using a micromirror such as a digital micromirror device (DMD) providing the light modulation device is capable of modulating the incident light beam to form the image corresponding to the image information.

In the embodiment described above, there is cited an example in which the light source device 4 is applied to the projector 1. However, this is not a limitation, and it is also possible for the light source device according to the present disclosure to be adopted in, for example, lighting equipment, and a spotlight or the like of a vehicle or the like.

What is claimed is:

1. A light source device comprising:
   a light source configured to emit excitation light;
   a wavelength conversion section configured to perform wavelength conversion on the excitation light to generate fluorescence having a wavelength longer than a wavelength of the excitation light;
   a substrate opposed to the wavelength conversion section; and
   an air gap disposed between the wavelength conversion section and the substrate, wherein
   the wavelength conversion section has a first surface opposed to the substrate, the substrate has a second surface opposed to the first surface,
   a thickness dimension of the air gap as a dimension in a direction from the first surface toward the second surface is defined by a sum of a roughness of the first surface and a roughness of the second surface, and
   the thickness dimension is no smaller than a wavelength of the fluorescence;
   wherein the thickness dimension is no larger than twice the wavelength of the fluorescence.

2. The light source device according to claim 1, wherein one of the first surface and the second surface has a plurality of protruding parts, and
   the air gap is formed by at least one of the protruding parts having contact with the other of the first surface and the second surface.

3. The light source device according to claim 1, wherein the fluorescence includes a green light component, and the thickness dimension is no smaller than 0.5 μm.

4. The light source device according to claim 1, wherein the substrate has a reflecting surface configured to reflect light emitted from the first surface.

5. The light source device according to claim 1, wherein the substrate has a dielectric multilayer opposed to the first surface.

6. The light source device according to claim 1, further comprising:
   a rotary section configured to rotate the substrate around a rotational axis along an incident direction of the excitation light with respect to the wavelength conversion section.

7. A projector comprising:
   the light source device according to claim 1;
   a light modulation device configured to modulate light emitted from the light source device in accordance with image information; and
   a projection optical device configured to project the light modulated by the light modulation device.

8. The light source device according to claim 1, wherein the light source device comprises a reflecting film disposed on the substrate, the air gap disposed between the first surface and the reflecting film.

9. A light source device comprising:
   a light source configured to emit excitation light;
   a wavelength conversion section configured to perform wavelength conversion on the excitation light to generate fluorescence having a wavelength longer than a wavelength of the excitation light;
   a substrate opposed to the wavelength conversion section; and
   an air gap disposed between the wavelength conversion section and the substrate, wherein
   the wavelength conversion section has a first surface opposed to the substrate, the substrate has a second surface opposed to the first surface,
   a thickness dimension of the air gap as a dimension in a direction from the first surface toward the second surface is defined by a sum of a roughness of the first surface and a roughness of the second surface, and
   the thickness dimension is no smaller than a wavelength of the fluorescence,
   wherein the light source device comprises a reflecting film disposed on the substrate, the air gap disposed between the first surface and the reflecting film.

10. The light source device according to claim 9, wherein one of the first surface and the second surface has a plurality of protruding parts, and
    the air gap is formed by at least one of the protruding parts having contact with the other of the first surface and the second surface.

11. The light source device according to claim 9, wherein the fluorescence includes a green light component, and the thickness dimension is no smaller than 0.5 μm.

12. The light source device according to claim 9, wherein the thickness dimension is no larger than twice the wavelength of the fluorescence.

13. The light source device according to claim 9, wherein the substrate has a reflecting surface configured to reflect light emitted from the first surface.

14. The light source device according to claim 9, wherein the substrate has a dielectric multilayer opposed to the first surface.

15. The light source device according to claim 9, further comprising:

a rotary section configured to rotate the substrate around a rotational axis along an incident direction of the excitation light with respect to the wavelength conversion section.

16. A projector comprising:
the light source device according to claim 9;
a light modulation device configured to modulate light emitted from the light source device in accordance with image information; and
a projection optical device configured to project the light modulated by the light modulation device.

* * * * *